US012372011B2

(12) United States Patent
Neuberger et al.

(10) Patent No.: US 12,372,011 B2
(45) Date of Patent: Jul. 29, 2025

(54) BEARING CHAMBER HOUSING FOR A TURBOMACHINE

(71) Applicant: MTU Aero Engines AG, Munich (DE)

(72) Inventors: Florian Neuberger, Dorfen (DE); Daniel Kirchner, Dachau (DE); Georg Kempinger, Eching (DE); Stephan Doeppl, Eichenau (DE); Kaspar Wolf, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/829,444

(22) Filed: Jun. 1, 2022

(65) Prior Publication Data

US 2022/0397039 A1 Dec. 15, 2022

(30) Foreign Application Priority Data

Jun. 11, 2021 (DE) ........................ 102021115229.1

(51) Int. Cl.
*F01D 25/16* (2006.01)
*F01D 25/18* (2006.01)

(52) U.S. Cl.
CPC ........... *F01D 25/162* (2013.01); *F01D 25/18* (2013.01); *F05D 2220/323* (2013.01); *F05D 2230/60* (2013.01); *F05D 2260/98* (2013.01)

(58) Field of Classification Search
CPC ........ F01D 25/16; F01D 25/162; F01D 25/18; F01D 9/065; F05D 2260/98; F02C 7/06
See application file for complete search history.

(56) References Cited

U.S. PATENT DOCUMENTS

| | | | | | |
|---|---|---|---|---|---|
| 2,882,105 | A * | 4/1959 | Broadbent | F01D 25/18 384/473 |
| 6,983,608 | B2 | 1/2006 | Allen et al. | |
| 9,500,230 | B2 * | 11/2016 | Hiller | F16C 33/6681 |
| 10,036,279 | B2 | 7/2018 | Ertas et al. | |
| 10,794,222 | B1 * | 10/2020 | Ganiger | F16C 27/04 |
| 2016/0326959 | A1 * | 11/2016 | Burnside | F02C 7/06 |

(Continued)

FOREIGN PATENT DOCUMENTS

| | | | |
|---|---|---|---|
| EP | 0 251125 | B1 | 3/1989 |
| GB | 2136886 | A | 9/1984 |

(Continued)

*Primary Examiner* — Woody A Lee, Jr.
*Assistant Examiner* — Jesse M Prager
(74) *Attorney, Agent, or Firm* — Davidson Kappel LLC

(57) ABSTRACT

A bearing chamber housing (20) for bearing a shaft (3) of a turbomachine (1), including a housing outer shell (21) that delimits an oil chamber (33) of the bearing chamber housing (20) radially outwardly in relation to a rotational axis (4) of the shaft (3), and a housing inner shell (22) for bearing the shaft (3). The housing inner shell (22) is radially connected to the housing outer shell (21) via support ribs (23) that in each case extend axially, at least in part, and the housing inner shell (22), the housing outer shell (21), and two support ribs (23) that are next-adjacent to one another jointly delimit a cavity (41) that is axially open at the rear, and thus lead into a rear opening (32). The rear opening (32), viewed in tangential sections, has a clearance (35) in each case that constitutes at least 50% of a circumferential distance (43) between the next-adjacent support ribs (23).

16 Claims, 3 Drawing Sheets

(56) References Cited

U.S. PATENT DOCUMENTS

| | | | | |
|---|---|---|---|---|
| 2019/0301302 | A1 | 10/2019 | Eastwood et al. | |
| 2020/0080435 | A1 * | 3/2020 | Durocher ................ | F01D 9/065 |
| 2020/0096041 | A1 * | 3/2020 | Wojtyczka .............. | F16C 27/02 |
| 2020/0256213 | A1 | 8/2020 | Throughton et al. | |
| 2021/0016498 | A1 | 1/2021 | Ovaere et al. | |
| 2021/0033003 | A1 | 2/2021 | Ovaere et al. | |
| 2021/0215066 | A1 * | 7/2021 | Lefebvre ............... | F01D 25/162 |
| 2021/0348522 | A1 * | 11/2021 | Demitraszek, Sr. .. | F01D 25/164 |

FOREIGN PATENT DOCUMENTS

| | | | |
|---|---|---|---|
| JP | 2005180418 | A | 7/2005 |
| WO | WO2019180363 | A1 | 9/2019 |
| WO | WO2019180365 | A1 | 9/2019 |

* cited by examiner

A-A

BEARING CHAMBER HOUSING FOR A TURBOMACHINE

CROSS-REFERENCE TO RELATED APPLICATIONS

This claims the benefit of German Patent Application DE 102021115229.1, filed on Jun. 11, 2021 which is hereby incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

The present invention relates to a bearing chamber housing for bearing a shaft of a turbomachine.

(2) Description of Related Art Including Information Disclosed Under 37 CFR 1.97 and 1.98

The turbomachine may be a jet engine, for example, such as a turbofan engine. The turbomachine is functionally divided into a compressor, a combustion chamber, and a turbine. In the case of the jet engine, for example, aspirated air is compressed by the compressor and combusted with admixed jet fuel in the downstream combustion chamber. The resulting hot gas, a mixture of combustion gas and air, flows through the downstream turbine and is expanded in the process. The turbine is generally made up of multiple stages, each including a stator (guide blade ring) and a rotor (rotor blade ring), and the rotors are driven by the hot gas. In each stage, internal energy is proportionately withdrawn from the hot gas and converted into a motion of the particular rotor blade ring, and thus of the shaft.

BRIEF SUMMARY OF THE INVENTION

The present subject matter relates to a bearing chamber housing for bearing the shaft; the reference to a jet engine is not intended to limit the generality of the concept according to the present invention. The turbomachine may also be a stationary gas turbine, for example.

One object underlying the present invention is to provide a particularly advantageous bearing chamber housing for a turbomachine, and an advantageous method for manufacturing same.

The present invention provides a bearing chamber housing which includes a housing outer shell and a housing inner shell. Situated between the housing shells is an oil chamber of the bearing chamber housing, in which the oil may collect. The housing outer shell delimits the oil chamber radially outwardly in relation to a rotational axis of the shaft. The housing inner shell is situated radially within the housing outer shell, and preferably forms a bearing receptacle in which a bearing for bearing the shaft, such as a ball bearing or roller bearing, may be or become situated. The housing inner shell is radially connected to the housing outer shell via support ribs which in each case extend axially, at least in part, and which are formed in one piece with the housing inner shell and the housing outer shell. During operation, the bearing forces are at least partially absorbed by the housing inner shell, the resulting power flow extending through the support ribs. The support ribs thus form a supporting structure between the housing inner shell and the housing outer shell.

Two support ribs that are next-adjacent to one another jointly delimit a cavity (together with the housing shells); in the present case this cavity is axially open at the rear, and thus leads into a rear opening. Viewed in tangential sections, this rear opening has a clearance in each case that constitutes at least 50% of a circumferential distance between the next-adjacent support ribs, and that preferably corresponds essentially to the circumferential distance. In other words, the housing inner shell is then suspended on the housing outer shell without a cantilever extending in the circumferential direction, i.e., has a design without a cantilever. In other words, the housing shells are then connected to one another solely via the support ribs. Overhangs may thus be reduced or avoided at the axially rear ends of the support ribs, which may be advantageous in terms of manufacturing, for example. The bearing chamber housing may thus be amenable in particular to generative manufacturing; the housing shells and the support ribs are preferably a generatively manufactured part, as described in greater detail below.

Preferred specific embodiments are set forth in the dependent claims and in the overall disclosure, in the description of the features, a distinction not always being made in particular between device aspects and method aspects or use aspects; in any case, the disclosure is to be implicitly construed with regard to all claim categories. For example, if reference is made to a bearing chamber housing that is manufactured in a certain way, this is always to be construed as a disclosure of a corresponding manufacturing method, and vice versa.

The tangential sections for considering the rear opening of the cavity are taken, for example, between 10% and 90% of the radial extension of the cavity, which is taken from radially inwardly to radially outwardly (0% is situated at the outer wall surface of the housing inner shell, and 100% is situated at the inner wall surface of the housing outer shell). As stated, the clearance of the rear opening constitutes at least 50%, increasingly preferably at least 60%, 70%, 80%, 90%, 100%, in the order stated, of a circumferential distance between the next-adjacent support ribs. The circumferential distance is taken at least in part, preferably completely, in the circumferential direction. The reference surfaces for the distance between the ribs are the side faces of the ribs facing the cavity in each case.

In a radially central tangential section, the support ribs extending axially, at least in part, have a basic shape, for example, such that the ratio of the average wall thickness to the axial extension is at least 3, 4, or 5 (with possible upper limits of at most 100 or 50, for example). The basic shape of the support ribs is thus elongate in the axial direction. Regardless, the support ribs in each case extend "axially at least in part," which refers to a proportion in the axial direction, increasingly preferably at least 70%, 80%, 90%, in the order stated, preferably a completely axial extension (100%).

Within the scope of the present disclosure, the terms "axial" and "radial" as well as the associated directions refer to the rotational axis of the shaft, which coincides with the longitudinal axis of the shaft when the turbomachine is considered as a whole. During operation, the rotors rotate "circumferentially" about the rotational axis, namely, in the "circumferential direction." "A" and "an," as indefinite articles, are thus always also understood to mean "at least one" unless expressly stated otherwise. As will become clear in particular in the following discussion, there may be a plurality of cavities that are distributed over a full revolution, for example.

The oil that collects in the cavity is typically drawn off during operation with the aid of oil recirculation pumps and pumped into a collecting line, via which it is transported back to the oil tank. In addition, the oil flow necessary for this discharge may be improved by the cavity that is axially open at the rear. Overall, the present invention may facilitate a bearing chamber housing that is advantageous during operation, and that is lightweight and at the same time rigid.

In one preferred specific embodiment, the side faces of a particular support rib, opposite one another in the circumferential direction, converge solely convexly at their axially rear end. The shape of their side faces, which are "convex" as viewed from outside the support rib, may in turn help to avoid overhangs or undercuts, for example in relation to a buildup direction from axially front to the rear. The rear end of the particular support rib may be designed as an edge, or generally also as a face. Viewed in tangential sections, two correspondingly shaped next-adjacent support ribs form a circumferential distance which does not decrease in the axial progression, but, rather, remains the same or increases.

In one preferred embodiment, at least one of the support ribs has a wall thickness that is variable, and which thus changes, over an axial extension and/or radial extension of the support rib. The wall thickness is taken in the circumferential direction, between the two side faces of the support rib. The variable wall thickness, which is possible in particular using generative manufacturing, may ensure a better thermal or thermomechanical compensation between the housing outer shell and the housing inner shell, and may thus take, for example, thermal expansions during operation into account.

In one preferred embodiment, the support ribs have different wall thicknesses, i.e., in a comparison from support rib to support rib. At least some of the support ribs thus have different average wall thicknesses, which are taken in each case as the average value of the particular support rib. The different wall thicknesses may, for example, facilitate more uniform rigidity in the circumferential direction.

In one preferred specific embodiment, at least one of the support ribs, viewed in an axial section plane, with its front edge forms an angle of at least 20° and at most 80° with the housing inner shell and the housing outer shell. The front edge thus extends obliquely into the housing inner shell and the housing outer shell, i.e., not perpendicularly. In each case the smaller of two angles that jointly enclose the rear edge and the housing inner shell or housing outer shell is considered.

In one preferred specific embodiment, at least one of the support ribs, viewed in an axial section plane, with its rear edge forms an angle of at least 20° and at most 80° with the housing inner shell or housing outer shell. The rear edge thus extends obliquely into the housing inner shell and housing outer shell, i.e., not perpendicularly. Once again, the smaller of two angles that jointly enclose the rear edge and the housing inner shell or housing outer shell are considered. The front edge and/or the rear edge are/is preferably oblique such that the axial length of the support rib increases from radially inwardly to outwardly.

In one preferred embodiment, a total of at least 3 support ribs, increasingly preferably at least 4, 5, 6, 7, or 8, in the order stated, are provided. Advantageous upper limits may be at most 200, 150, or 100, for example.

In one preferred specific embodiment, a fluid channel is integrated into one of the support ribs. This fluid channel may be an oil channel or air channel, for example; i.e., an appropriate fluid may flow through it during operation. The fluid channel may in particular be part of the oil system of the bearing chamber housing, via which the oil from outside may be transported into and distributed in the bearing chamber housing. The term "integrated" means, for example, that the housing material itself encloses the fluid channel, in particular surrounds it on all sides.

In one preferred specific embodiment, the extension of the fluid channel, at least in sections, has a nonlinear progression, for example also with a radial component in addition to an axial component, it being possible for the ratio of the components to change along the channel. A description in general of the "extension" of the fluid channel refers to the progression of its center line, which extends centrally in the fluid channel along its length. Viewed in section planes perpendicular to the through flow, the center line is situated in each case in the centroid of the area of the inner cross section, i.e., the flow cross section. This center line then has a curvature over at least one section of the fluid channel, i.e., does not extend linearly.

According to one preferred specific embodiment, a fluid channel is (also) integrated into the housing inner shell; it may thus in particular transport oil between the support ribs. This fluid channel is preferably connected to the fluid channel that is integrated into the support rib, and the two fluid channels thus form a continuous channel. Various oil spray nozzles, for example, which are supplied with oil via the fluid channel that is integrated into the housing inner shell may be provided in a circumferential distribution. The term "integrated" here once again means that the housing material itself encloses the fluid channel, in particular surrounds it on all sides.

Moreover, the present invention relates to a turbine intermediate housing for a turbomachine, in particular a jet engine, including a bearing chamber housing that is described herein. The turbine intermediate housing may generally also be situated between the combustion chamber and the turbine module(s), and is preferably designed for arrangement between two turbine modules, for example between a high-pressure turbine and a medium or low-pressure turbine. One or multiple bearings for guiding the shaft may be situated in the bearing chamber housing, for example a roller bearing in the case of the exemplary embodiment. In one preferred embodiment, radially outside the bearing chamber housing, the turbine intermediate housing delimits a hot gas channel section through which the hot gas flows downstream from the combustion chamber during operation of the turbomachine.

Furthermore, the present invention relates to a method for manufacturing a bearing chamber housing or turbine intermediate housing described herein, the housing inner shell, the housing outer shell, and the support ribs being generatively built up. The generative buildup preferably takes place from front to rear in the axial direction, for example in a powder bed process (which may also be preferred, regardless of the buildup direction). The material used in the buildup may thus be sequentially applied layer by layer in powder form. For each layer, a predetermined area is selectively consolidated based on the data model (the component geometry). The consolidation takes place by melting with the aid of a beam source, an electron beam source, for example, also generally being conceivable. A laser source is preferred; i.e., melting is carried out using a laser beam, and the generative buildup is then selective laser melting (SLM).

Moreover, the present invention relates to the use of a bearing chamber housing or turbine intermediate housing described herein for a turbomachine, in particular for an aircraft engine. The bearing chamber housing then accommodates the shaft of the turbomachine, rotates it about the rotational axis during operation, and the oil chamber of the bearing chamber housing is filled with oil. Oil preferably flows through the fluid channel for supplying oil to the bearing chamber housing.

BRIEF DESCRIPTION OF THE SEVERAL VIEWS OF THE DRAWING(S)

The present invention is explained in greater detail below with reference to exemplary embodiments, it being possible for the individual features, within the scope of the other independent claims besides the main claim, to also be in some other combination that is essential to the present invention, in particular a distinction also not being made between the different claim categories.

DETAILED DESCRIPTION OF THE INVENTION

Figure 1:
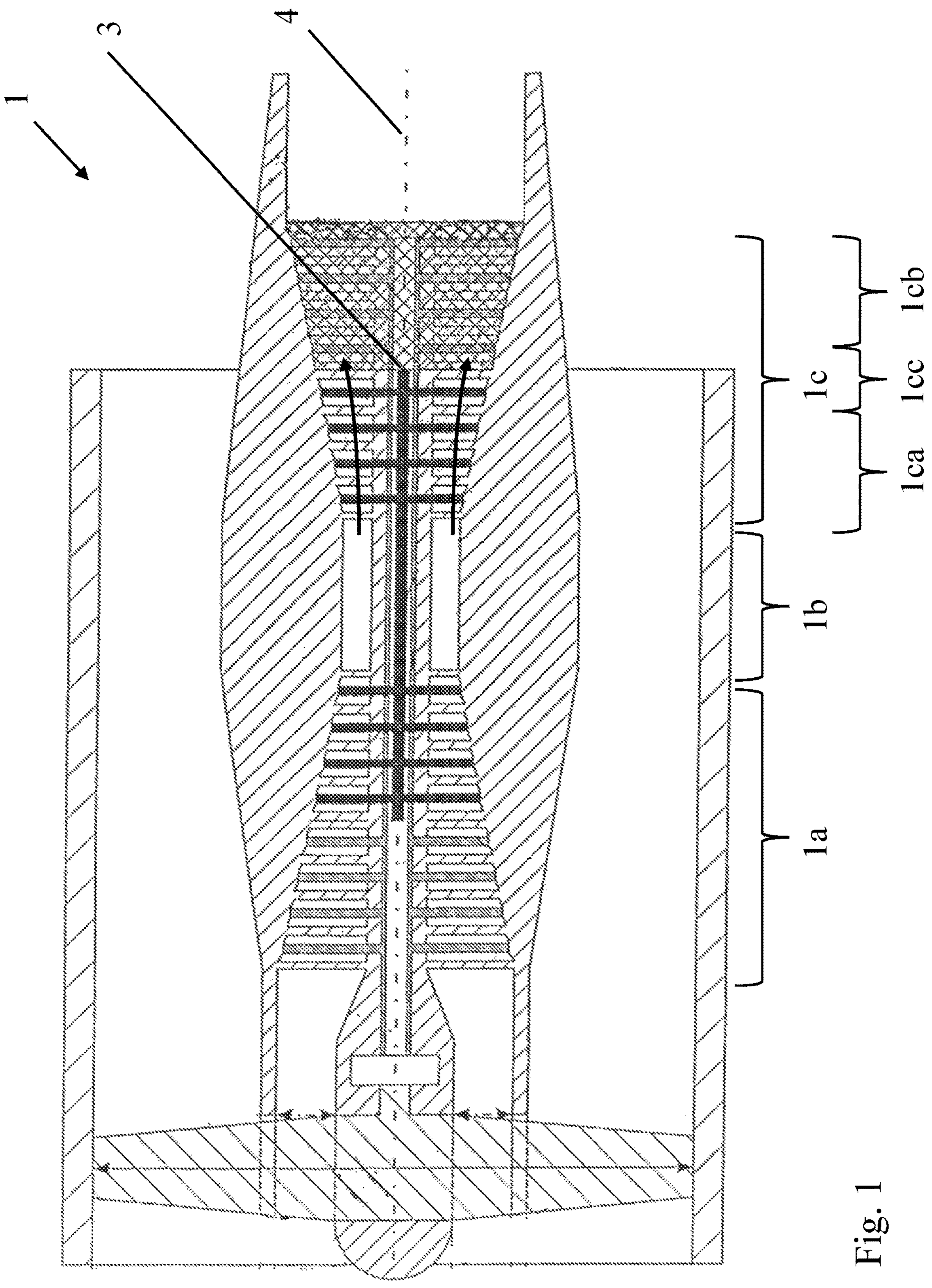
FIG. 1 shows a jet engine in an axial section.

FIG. 1 shows a turbomachine 1, specifically, a jet engine, in a schematic view. Turbomachine 1 is functionally divided into a compressor 1*a*, a combustion chamber 1*b*, and a turbine 1*c*. In the present case, compressor 1*a* and turbine 1*c* are each made up of two modules. Turbine intermediate housing 1*cc* is situated between a high-pressure turbine module 1*ca*, directly downstream from combustion chamber 1*b*, and a low- or medium-pressure turbine module 1*cb*. The rotors of turbine module 1*ca* rotate on a shaft 3 about a rotational axis 4. A bearing or bearings for this shaft 3 is/are situated in turbine intermediate housing 1*cc*.

Figure 2:
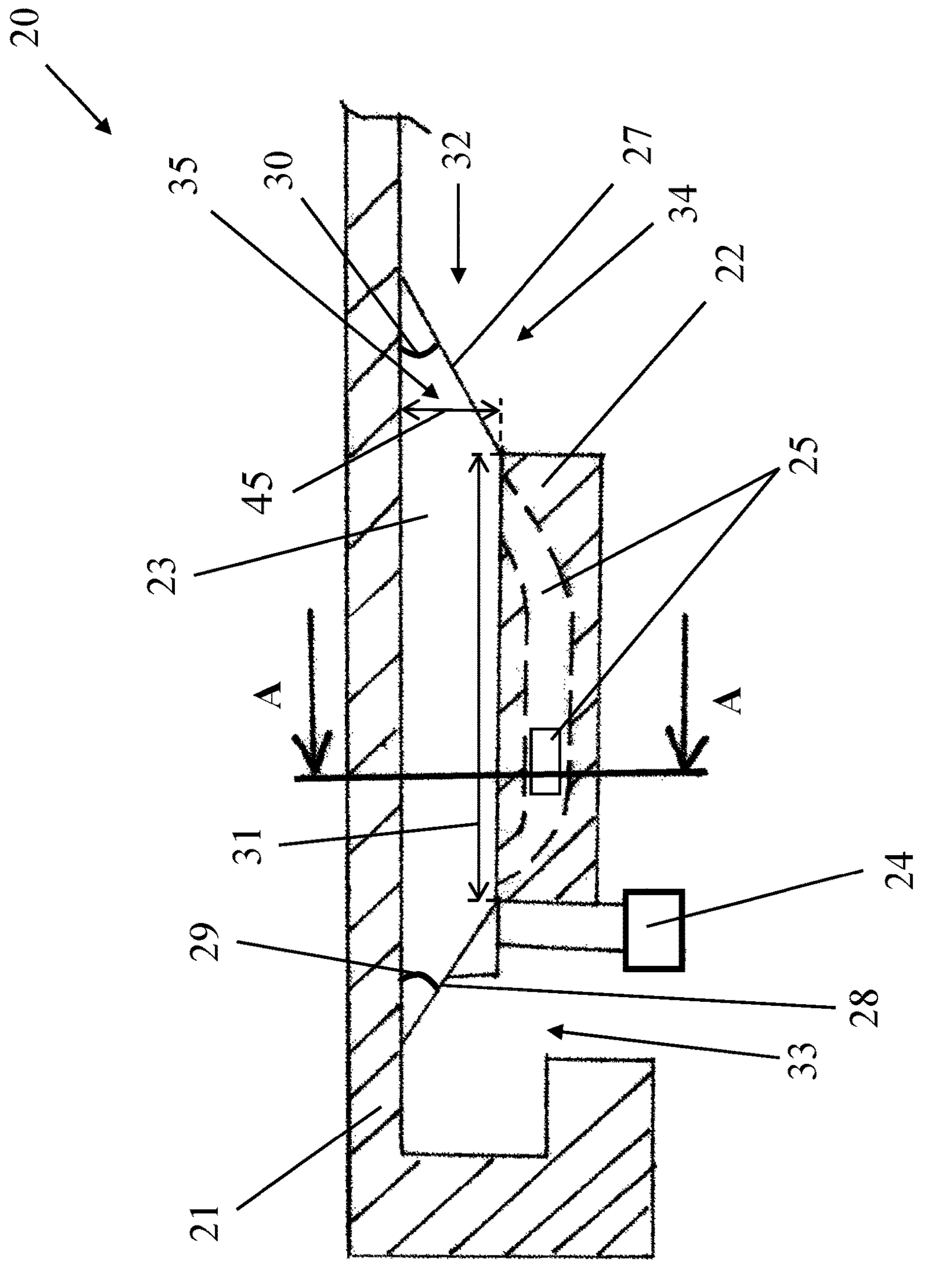
FIG. 2 shows a bearing chamber housing according to the present invention in an axial sectional side view.

FIG. 2 shows a portion of a bearing chamber housing 20 according to the present invention in a partially axial sectional side view, the section plane thus encompassing rotational axis 4. Bearing chamber housing 20 includes a housing outer shell 21 that radially delimits an oil chamber 33. Housing inner shell 22 is radially connected to housing outer shell 21 via support ribs 23; these parts are generatively built up jointly. A front edge 28 of support rib 23 forms an angle 29 of approximately 35° with housing outer shell 21 (and also with housing inner shell 22). Rear edge 27 of the support rib forms an angle 30 of approximately 30° with housing outer shell 21 (and also with housing inner shell 22).

A fluid channel 25, shown by dashed lines, having a nonlinear progression in sections is integrated into support rib 23, and also extends into housing inner shell 22 and transports oil from the outside to oil nozzles 24, which supply the roller bearings with oil. Fluid channel 25 also transports oil between ribs 23 in housing inner shell 22. Reference numeral 34 denotes the axially rear end of rib 23 together with rear opening 32.

Figure 3:
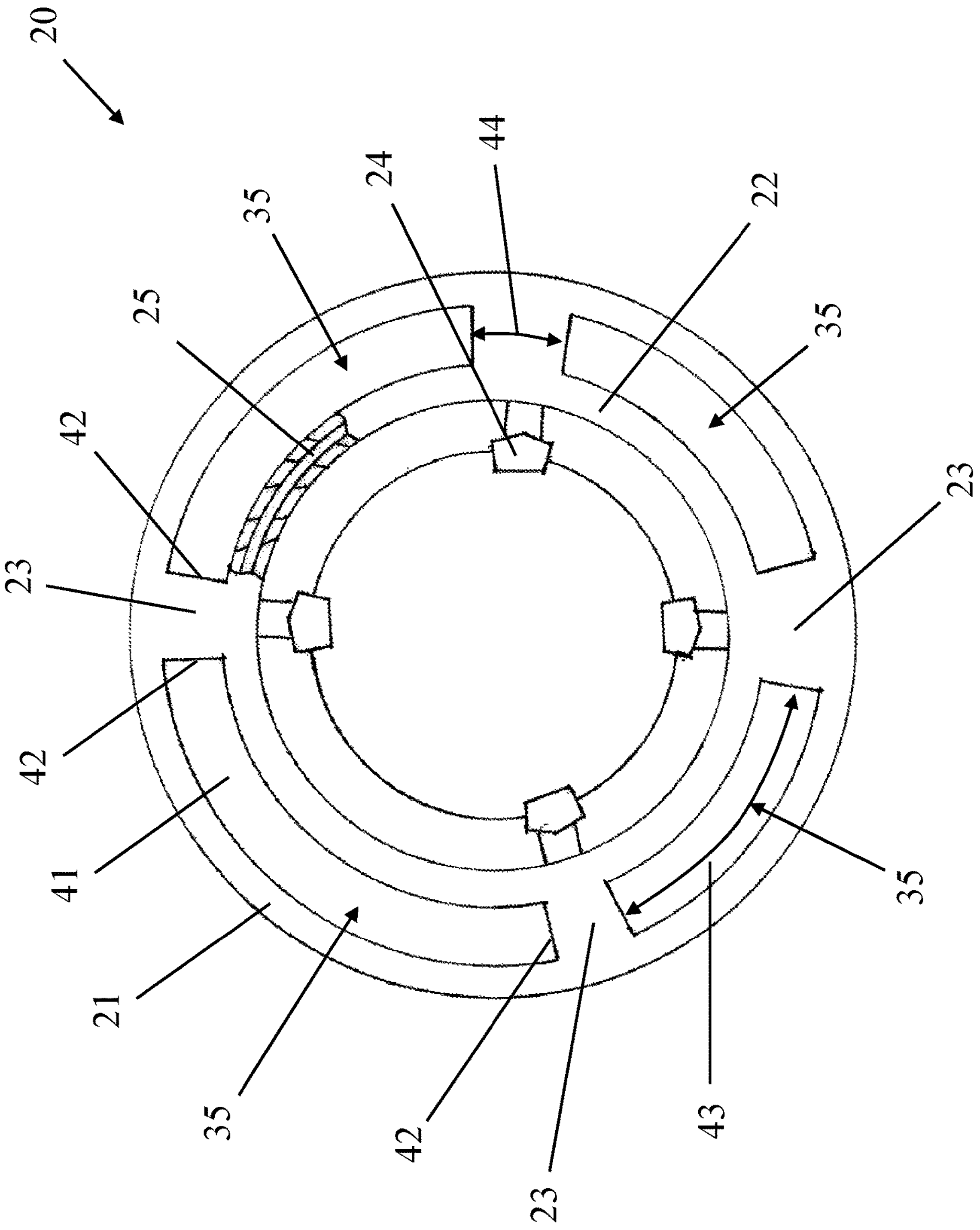
FIG. 3 shows the bearing chamber housing according to FIG. 2 in section A-A.

FIG. 3 shows the bearing chamber housing in section A-A according to FIG. 2. Reference numeral 43 denotes the circumferential distance between two next-adjacent support ribs 23. Support ribs 23 each include two side faces 42, opposite one another in the circumferential direction, which converge solely convexly at an axially rear end 34 of particular rib 23. Support ribs 23 have a wall thickness 44, taken in the circumferential direction, that is variable over the axial extension of support rib 23. Support ribs 23 also differ in their average wall thicknesses. In this preferred embodiment, clearance 35 of rear opening 32 in the tangential section corresponds to circumferential distance 43, and cavity 41 is thus axially open at the rear without constrictions, etc.

Apparent once again is fluid channel 25, which transports the oil in housing inner shell 22 between support ribs 23, and partially supplies the other oil nozzles 24, distributed over the circumference, with oil. Cavity 41 is delimited by housing inner shell 22, housing outer shell 21, and two next-adjacent support ribs 23.

LIST OF REFERENCE NUMERALS

1 turbomachine
1*a* compressor
1*b* combustion chamber
1*c* turbine
1*ca* high-pressure turbine module
1*cb* low or medium-pressure turbine module
1*cc* turbine intermediate housing
3 shaft
4 rotational axis
20 bearing chamber housing
21 housing outer shell
22 housing inner shell
23 support ribs
24 oil nozzle
25 fluid channel
27 rear edge of the support rib in the axial section
28 front edge of the support rib in the axial section
29 angle between the front edge and the housing outer shell
30 angle between the rear edge and the housing outer shell
31 axial extension of the support rib
32 rear opening of the cavity
33 oil chamber
34 axially rear end of the support rib
35 clearance of the rear opening
41 cavity
42 side faces
43 circumferential distance
44 wall thickness
45 radial extension of the support rib

What is claimed is:

1. A bearing chamber housing for bearing a shaft of a turbomachine, the bearing chamber housing comprising:

a housing outer shell delimiting an oil chamber of the bearing chamber housing radially outwardly in relation to a rotational axis of the shaft; and a housing inner shell for bearing the shaft;

the housing inner shell being radially connected to the housing outer shell via support ribs in each case extending axially, at least in part, and the housing inner shell, the housing outer shell and two of the support ribs next-adjacent to one another jointly delimiting a cavity axially open at a rear, and thus leading into a rear opening, the rear opening, in a tangential sectional view, having a clearance constituting at least 50% of a circumferential distance between the two support ribs, measured at a middle position between the housing inner shell and housing outer shell;

wherein a fluid channel is integrated into one of the two support ribs; and an oil nozzle, the fluid channel transporting oil to the oil nozzle, the oil nozzle supplying a bearing with oil.

2. The bearing chamber housing as recited in claim 1 wherein the two support ribs each include two side faces, opposite one another in the circumferential direction, in each case converging solely convexly or concavely up to 75° with respect to a center axis of the bearing chamber housing, at an axially rear end of the particular support rib.

3. The bearing chamber housing as recited in claim 1 wherein at least one of the two support ribs has a wall thickness, taken in the circumferential direction, variable over an axial extension or radial extension of the at least one support rib.

4. The bearing chamber housing as recited in claim 1 wherein at least one of the two support ribs differ in wall thicknesses, and as a result have different average wall thicknesses.

5. The bearing chamber housing as recited in claim 1 wherein at least one of the two support ribs, viewed in an axial section plane, has a front edge forming an angle of at least 20° and at most 80° with the housing inner shell and the housing outer shell.

6. The bearing chamber housing as recited in claim 1 wherein at least one of the two support ribs, viewed in an axial section plane, has a rear edge forming an angle of at least 20° and at most 80° with the housing inner shell and the housing outer shell.

7. The bearing chamber housing as recited in claim 1 wherein an overall number of the support ribs is at least 3 and at most 200.

8. The bearing chamber housing as recited in claim 1 wherein the fluid channel has a nonlinear extension, at least in sections.

9. The bearing chamber housing as recited in claim 1 wherein the fluid channel also is integrated into the housing inner shell.

10. A turbine intermediate housing for a turbomachine comprising the bearing chamber housing as recited in claim 1.

11. A method for manufacturing the bearing chamber housing as recited in claim 1, the method comprising generatively building up jointly the housing inner shell, the housing outer shell, and the support ribs.

12. The method as recited in claim 11 wherein the housing inner shell, the housing outer shell, and the support ribs are generatively built up from front to rear in the axial direction.

13. A method comprising using the bearing chamber housing as recited in claim 1 as a bearing chamber housing for a turbomachine.

14. The method as recited in claim 13 wherein the turbomachine is an aircraft engine.

15. A method for operating the bearing chamber housing as recited in claim 1 comprising flowing oil through the fluid channel.

16. A method for operating the bearing chamber housing as recited in claim 9 comprising flowing oil through the fluid channel.

* * * * *